(12) United States Patent
Shung et al.

(10) Patent No.: US 10,405,139 B2
(45) Date of Patent: Sep. 3, 2019

(54) PORTABLE ELECTRONIC DEVICES WITH AN EMERGENCY MODE FOR LOCATING SURVIVORS IN DISASTERS

(71) Applicant: MediaTek Inc., Hsinchu (TW)

(72) Inventors: Chuen-Shen Bernard Shung, San Jose, CA (US); Jianhan Liu, San Jose, CA (US); George Chien, Saratoga, CA (US); YungPing Hsu, Taipei (TW); Yasantha Rajakarunanayake, San Ramon, CA (US); Dingchung Jann, Fremont, CA (US); Tom Hsiou-Cheng Kao, Fremont, CA (US)

(73) Assignee: MediaTek Inc., Hsin-Chu (TW)

( * ) Notice: Subject to any disclaimer, the term of this patent is extended or adjusted under 35 U.S.C. 154(b) by 0 days.

(21) Appl. No.: 15/470,000

(22) Filed: Mar. 27, 2017

(65) Prior Publication Data

US 2017/0347234 A1  Nov. 30, 2017

Related U.S. Application Data

(60) Provisional application No. 62/343,172, filed on May 31, 2016.

(51) Int. Cl.
*H04W 4/02* (2018.01)
*H04W 4/90* (2018.01)
(Continued)

(52) U.S. Cl.
CPC .......... *H04W 4/023* (2013.01); *G08B 3/1008* (2013.01); *G08B 25/016* (2013.01);
(Continued)

(58) Field of Classification Search
CPC ... H04W 4/023; H04W 4/22; H04W 72/0453; H04W 56/002; H04W 52/0229;
(Continued)

(56) References Cited

U.S. PATENT DOCUMENTS 9,226,260 B2  12/2015  Steiner
9,342,974 B2  5/2016  Mo et al.
(Continued)

FOREIGN PATENT DOCUMENTS

CN  101764872 A  6/2010
CN  101790145 A  7/2010
(Continued)

*Primary Examiner* — Joseph E Dean, Jr.
(74) *Attorney, Agent, or Firm* — Wolf, Greenfield & Sacks, P.C.

(57) ABSTRACT

An emergency mode is provided in a portable electronic device for locating a survivor in a disaster. The device includes a wireless antenna to transmit and receive wireless signals; a memory to store one or more identifiers; a user interface to receive a command that enables the emergency mode. The device also includes one or more processors, which, in response to the command, detect via the wireless receiver a predetermined identifier that matches a stored identifier identifying a sender of the predetermined identifier as a trusted node. When the predetermined identifier and a timing measurement frame are received from the trusted node, the device sends a response to the trusted node to indicate its presence.

19 Claims, 6 Drawing Sheets

(51) Int. Cl.
*H04W 56/00* (2009.01)
*H04W 52/02* (2009.01)
*H04W 72/04* (2009.01)
*H04L 5/00* (2006.01)
*G08B 3/10* (2006.01)
*G08B 25/01* (2006.01)
*H04W 84/12* (2009.01)
*G08B 21/02* (2006.01)

(52) U.S. Cl.
CPC ............. *H04L 5/0055* (2013.01); *H04W 4/90* (2018.02); *H04W 52/0229* (2013.01); *H04W 52/0264* (2013.01); *H04W 52/0274* (2013.01); *H04W 56/002* (2013.01); *H04W 72/0453* (2013.01); *G08B 21/0272* (2013.01); *H04W 84/12* (2013.01); *Y02D 70/14* (2018.01); *Y02D 70/142* (2018.01); *Y02D 70/164* (2018.01); *Y02D 70/20* (2018.01); *Y02D 70/26* (2018.01)

(58) Field of Classification Search
CPC ......... H04W 52/0274; H04W 52/0264; H04W 84/12; G08B 3/1008; H04L 5/0055
See application file for complete search history.

(56) References Cited

U.S. PATENT DOCUMENTS

| | | | |
|---|---|---|---|
| 9,420,445 | B2 | 8/2016 | Vedhanarayanan |
| 9,924,017 | B2* | 3/2018 | Dickow ............ H04M 1/72527 |
| 2003/0157924 | A1* | 8/2003 | Fujiki .................. G08B 25/016 |
| | | | 455/404.1 |
| 2004/0203573 | A1* | 10/2004 | Chin ...................... H04W 4/22 |
| | | | 455/404.1 |
| 2010/0323683 | A1* | 12/2010 | Kazmi .................. H04W 64/00 |
| | | | 455/422.1 |
| 2011/0086608 | A1* | 4/2011 | Yamagishi ........... G08B 27/006 |
| | | | 455/404.1 |
| 2014/0197948 | A1 | 7/2014 | Mo et al. |
| 2015/0195694 | A1* | 7/2015 | Vedhanarayanan ..... H04W 4/90 |
| | | | 455/404.1 |
| 2016/0157077 | A1* | 6/2016 | Rudolf .................... H04W 4/22 |
| | | | 455/404.1 |
| 2017/0048671 | A1* | 2/2017 | Marri Sridhar ....... H04L 5/0055 |

FOREIGN PATENT DOCUMENTS

| | | |
|---|---|---|
| CN | 101917692 A | 12/2010 |
| CN | 102007785 A | 4/2011 |
| CN | 102752737 A | 10/2012 |
| CN | 103181202 A | 6/2013 |
| CN | 104796865 A | 7/2015 |
| TW | I539409 B | 6/2016 |

* cited by examiner

PORTABLE ELECTRONIC DEVICES WITH AN EMERGENCY MODE FOR LOCATING SURVIVORS IN DISASTERS

CROSS-REFERENCE TO RELATED APPLICATIONS

This application claims the benefit of U.S. Provisional Application No. 62/343,172 filed on May 31, 2016, the entirety of which is incorporated by reference herein.

TECHNICAL FIELD

Embodiments of the invention relate to an emergency mode that can be enabled on a portable electronic device.

BACKGROUND

Natural or man-made disasters, such as earthquakes, fires, hurricanes, and the like, can strike any place at any time. When survivors of such disasters are trapped inside collapsed buildings, burnt houses, or other hard-to-accessed places, a search-and-rescue team has very limited time to locate and save the lives of the survivors. In an earthquake rescue operation, an often-encountered rescue dilemma is whether or not to use heavy digging machinery to find the trapped survivors while not knowing where they are. Knowing the locations of the survivors allows more efficient and accurate use of the digging machinery, and therefore reduces the time to reach the survivors.

There have been a number of proposed systems for locating survivors in a disaster. For example, a "vital sign detector" was proposed to detect the heartbeat of a survivor through concrete wreckage, but its effectiveness has yet to be shown. An Enhanced 911 (E-911) system allows an emergency response team know roughly where a wireless call originates with an accuracy of a 50-meter radius or more. However, this accuracy is insufficient when it comes to determine the location of the survivors. A smartphone that subscribes to a location-based service (LBS) plan can locate itself with the global positioning system (GPS) and report its location to the service provider. The reliability of such a service in a disaster-stricken zone is unknown. There is also an emergency position-indicating radiobeacon system (EPIRS) provided mainly for cars, boat and aircraft due to the bulkiness of the system.

The advance of wireless communication have enabled widespread usage of cellular phones. Cellular phones have become one of the most pervasive devices that are carried around by people on a regular basis. However, in a disaster, cellular data and voice networks are unreliable. Cellular phones, as well as the other aforementioned systems, require an existing communication infrastructure that functions properly during a disaster. In a severe disaster, the communication infrastructure itself may be damaged.

Therefore, there is a need for a reliable and effective method, device and system for locating survivors in a disaster.

SUMMARY

In one embodiment, a method for a portable electronic device to provide an emergency mode, comprising: receiving a command via a user interface to enable the emergency mode; detecting, in response to the command and via a wireless receiver, a predetermined identifier that matches a stored identifier identifying a sender of the predetermined identifier as a trusted node; receiving a timing measurement frame from the trusted node; and sending a response to the trusted node to indicate presence of the portable electronic device.

In another embodiment, a portable electronic device provides an emergency mode.

The portable electronic device comprises: a wireless antenna including a wireless transmitter and a wireless receiver to transmit and receive wireless signals, respectively; a memory to store one or more identifiers; a user interface to receive a command that enables the emergency mode; and one or more processors coupled to the wireless antenna, the memory and the user interface. The one or more processors, in response to the command, are operative to: detect, via the wireless receiver, a predetermined identifier that matches a stored identifier identifying a sender of the predetermined identifier as a trusted node; receive a timing measurement frame from the trusted node; and send a response to the trusted node to indicate presence of the portable electronic device.

In yet another embodiment, a system for locating survivors of a disaster is provided. The system comprises a plurality of trusted nodes, each trusted node to form a wireless connection with a portable electronic device in an emergency mode. Each trusted node includes: a wireless antenna including a wireless transmitter and a wireless receiver to transmit and receive wireless signals, respectively; and a memory to store a predetermined identifier, to which the portable electronic device in the emergency mode is configured to respond; and one or more processors coupled to the wireless antenna and the memory. The one or more processors are operative to: send the predetermined identifier and a timing measurement frame via the wireless transmitter; and determine a distance to the portable electronic device based on a response from the portable electronic device. The trusted nodes are further operative to determine a location of the portable electronic device using the distance determined by each trusted node.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention enable a system to locate, in an emergency, users who have access to portable electronic devices (e.g., cellular phones, smartphones, smartwatches, etc.). These users are also referred to as the survivors of a disaster. In one embodiment, the portable electronic device provides an emergency mode, which may be enabled by a user via a hardware or software user interface using motion (e.g., touch, click, swipe, etc.), voice, or other easily accessible mechanisms. The emergency mode helps users of the portable electronic devices maximize their chances to be rescued in a disaster.

The embodiments described herein do not depend on existing communication infrastructure, which may be damaged and become unreliable in a severe disaster. Communication links that connect a survivor's device to a rescuer's device (referred to as a trusted node) can be established at the disaster site during the rescue operation. The distance between the survivor's device and the trusted node can be measured by a timing measurement. The trusted nodes are portable and lightweight, and can therefore be deployed (e.g., carried by a rescuer) close to the survivors to gain an improved link margin. Such improved link margin can help to reach survivors that are trapped behind several layers of concrete blockage.

In the following description, earthquake and fire are used as two examples of disasters. However, it is understood that the earthquake example may be applied to any disasters in which rescue operations may take hours, days or weeks such that it is desirable to conserve the device battery power. The fire example may be applied to any disasters in which immediate rescue is essential to the preservation of life, and, therefore, conservation of the device battery power is not a consideration.

Figure 1:
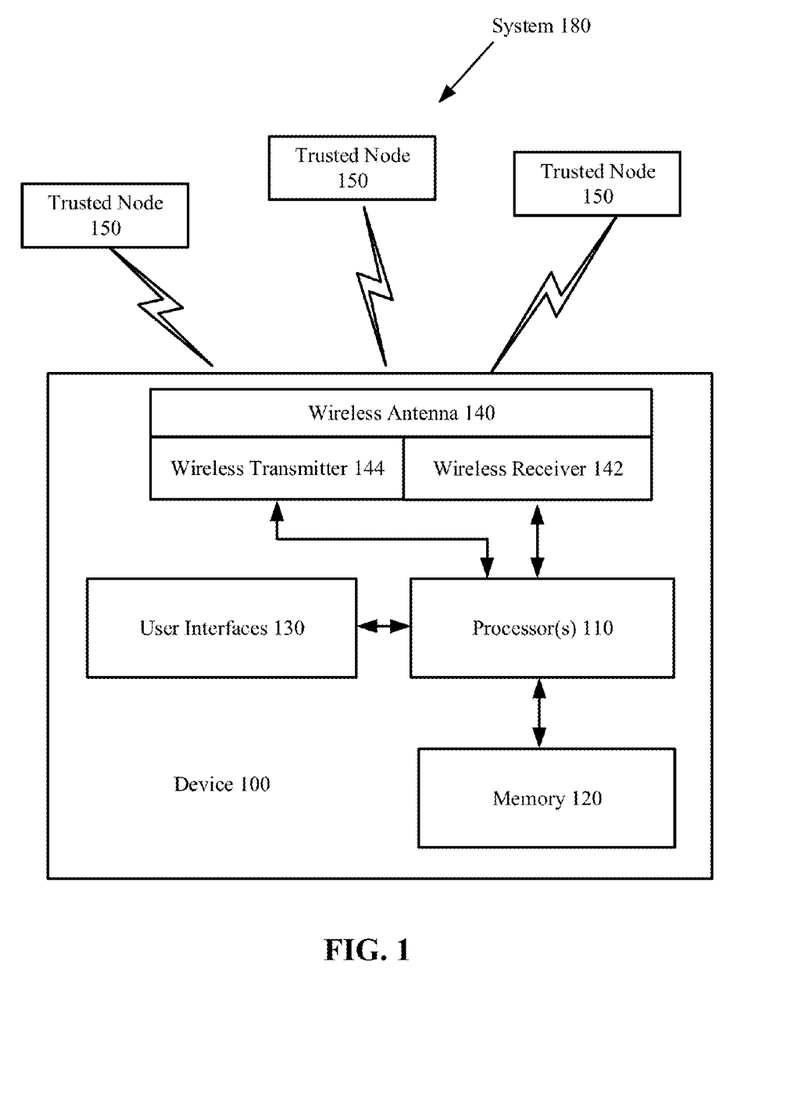
FIG. 1 illustrates an emergency survivor locating system in which a portable electronic device may operate according to one embodiment.

FIG. 1 illustrates a portable electronic device 100 (also referred to as the "device 100") operating in an emergency survivor locating system 180 according to one embodiment. The device 100 includes, but is not limited to: one or more processors 110, a memory 120, user interfaces 130 (e.g., touch screen display, touch pad, keypad, buttons, switches, microphone, speaker, etc.) and a wireless antenna 140 coupled to a wireless receiver 142 and a wireless transmitter 144. The device 100 may communicate with other wireless nodes via one or more wireless networks, such as a cellular network, a Wi-Fi network, or other wide area, local area or personal area wireless networks.

Via the user interface 130, a user may enable the emergency mode; for example, by a tapping, swiping, clicking, pressing or other motions on a displayed icon or switch, or on a hardware button or switch. In alternative embodiments, the emergency mode may be activated by voice or other means via the user interfaces 130.

The memory 120 in the device 100 may include a combination of volatile memory and non-volatile memory. In one embodiment, the non-volatile memory may store one or more predetermined identifiers (e.g., Service Set Identifiers (SSIDs)) that identify wireless networked nodes as trusted nodes 150. These predetermined identifiers, also referred to as the emergency identifiers, are used by the trusted nodes 150 to communicate with the device 100 in emergency only. In one embodiment, a manufacturer of the device 100 may program the one or more emergency identifiers into the device's memory 120. Additionally or alternatively, a user of the device 100 may download one or more emergency identifiers, e.g., by downloading a software application that includes the one or more emergency identifiers, from a public safety site provided by a public safety office such as a fire department or a police department.

For security reasons, the device 100 listens to messages identified by a predetermined identifiers only when its emergency mode is enabled. The predetermined identifier identifies to the device 100 that the sender of the timing measurement frame is a trusted source; i.e., a trusted node 150. The trusted node 150 is a wireless networked node deployed when or after a disaster strikes, and the trusted node 150 can form a wireless network connection with the device 100 after the device 100 enables its emergency mode. The trusted node 150 may repeatedly broadcast the predetermined identifier with a timing measurement frame over one or more predetermined frequency bands.

In one embodiment, one or more of the trusted nodes 150 may be Wi-Fi access points, which are networking hardware that wirelessly connects to Wi-Fi compliant devices. Wi-Fi access points are typically portable and lightweight. The trusted nodes 150 may be built to have strong transmission power to send its outgoing signals through concrete blockage, and low receiver sensitivity to detect weak incoming signals. In one embodiment, the trusted node 150 may use any of the Wi-Fi frequency bands (e.g., 2.4 GHz and 5 GHz) for communicating with the device 100. Because the 2.4 GHz band has a lower attenuation through concrete walls than the 5 GHz band, the trusted node 150 may prefer to use the 2.4 GHz band to communicate with survivors in an earthquake emergency. In a fire emergency, both 2.4 GHz and 5 GHz as well as other available frequency bands may be used.

When the emergency mode is enabled, the device 100 uses its wireless receiver 142 to detect an identifier that is being transmitted in a wireless network and matches one of its stored emergency identifiers. The detection of such an identifier indicates that the sender of the identifier is a trusted node 150. In one embodiment, the trusted node 150 may send a timing measurement frame along with the identifier. Upon receiving the identifier, the device 100 sends a response to the trusted node 150 to indicate its presence. In one embodiment, the response sent by the device 100 may include timing information that allows the trusted node 150 to measure its distance to the device 100. The device 100 may also send an identifier that identifies itself to the trusted node 150, as there may be multiple survivors at the disaster site waiting to be rescued. When three of more of these trusted nodes 150 measure their respective distances to the device 100, these distance measurements may be used to calculate the location of the device 100 by way of trilateration. Trilateration is the process of determining the location of a point by measurements of distances. If three of more of these trusted nodes 150 can coordinate their own locations and their measurements of distances to a survivor, then the survivor can be located with high accuracy.

In one embodiment, the trusted nodes 150 may communicate their distance measurements with each other or with a centralized station (which may be one of the trusted nodes 150 or another node). The communication among the trusted nodes 150 or with the centralized station may be via a wireless or wired network connection established at the rescue site.

In another embodiment, the response sent by the device 100 may be an audible sound (e.g., a siren), which allows the person in charge of the trusted node 150 (e.g., a firefighter carrying the trusted node 150) to locate the survivor in a fire.

Figure 2:
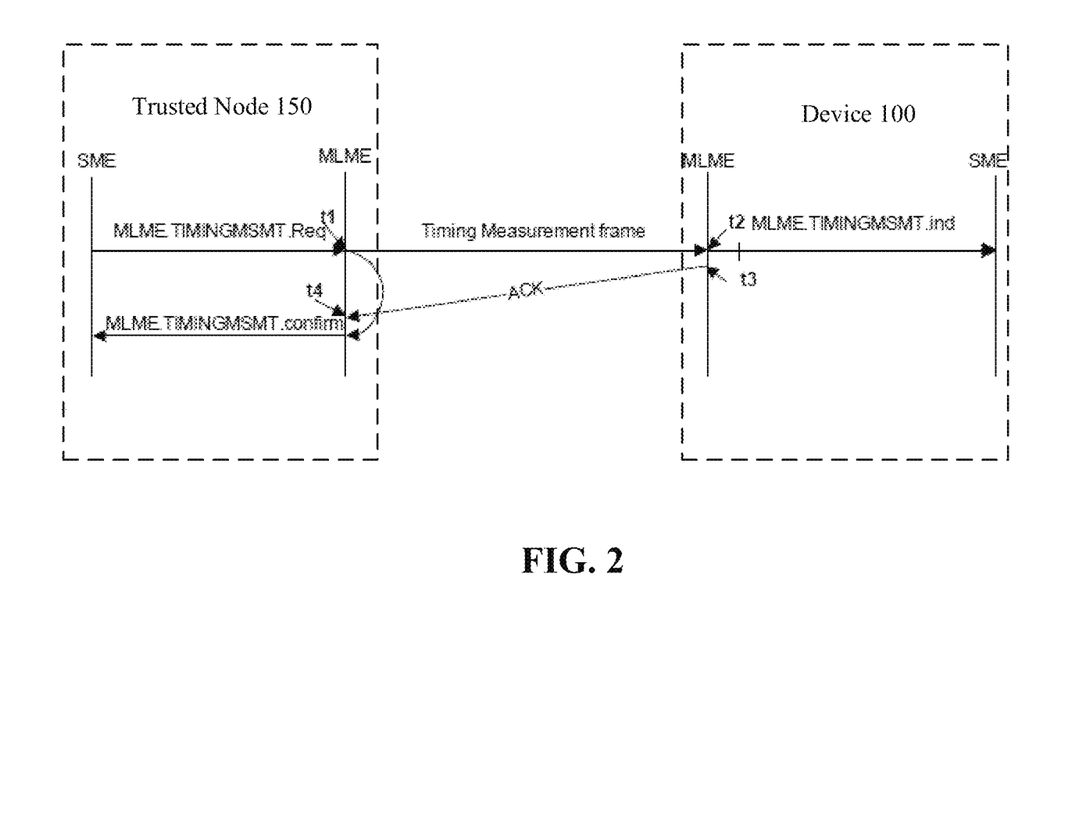
FIG. 2 is a timing diagram illustrating the data exchange between a trusted node and a portable electronic device according to one embodiment.

FIG. 2 is a timing diagram illustrating the data exchange for timing measurement between the trusted 150 and the device 100 according to one embodiment. The timing measurement can be performed by devices that adopt the Fine Timing Measurement (FTM) protocol standardized by the IEEE 802.11 working group. Such devices include all Wi-Fi compliant devices, including but not limited to all new generations of smartphones and Wi-Fi access points. Other portable electronic devices can also easily adopt the FTM protocol or variations thereof.

In the timing diagram, the Station Management Entity (SME) of the trusted node 150 requests the MAC Layer Management Entity (MLME) of the trusted node 150 to send a timing measurement frame at $t_1$. The MLME of the device 100 receives the frame at $t_2$, and sends an acknowledgement to the trusted node at $t_3$. The MLME of the trusted node 150 receives the acknowledgement at $t_4$.

Since $(t_2-t_1)$=traveling time+station clock offset, and $(t_4-t_3)$=traveling time−station clock offset, traveling time can be obtained by calculating $[(t_2-t_1)+(t_4-t_3)]/2$. The traveling time can be converted to distance by known conversion formulas. The trusted node 150 and the device 100 may exchange the information of time instants $t_1$, $t_2$, $t_3$ and $t_4$ such that one or both of them can calculate the distance between them. In one embodiment, the device 100 sends $t_2$ and $t_3$ to the trusted node 150 with the acknowledgement for the trusted node 150 (or another device connected to the trusted node 150) to calculate the distance. Three or more trusted nodes 150 can be deployed at a disaster site to trilaterate the location of the device 100.

Link margin consideration is critically important in the emergency mode operation. One reason that survivors generally cannot use existing infrastructure to communicate with rescuers is that they are trapped in concrete blockage and do not have enough link margin to communicate with a cellular base station hundreds of meters away. The trusted node 150 described herein may be deployed at a distance within 50 meters from the survivors, and can be built to have high output power amplifiers and low receiver sensitivity to gain high link margin.

Additionally or alternatively, the device 100 may communicate with a trusted node 150 via cellular voice and data connections. A trusted node 150 that provides cellular voice and data connections is built with hardware (e.g., base station hardware) more complicated and more heavyweight than a Wi-Fi access point, and therefore may be more difficult to be deployed near the survivors. However, it is understood that wireless connections between trusted nodes 150 and the device 100 may be established according to any wireless communication protocol, and is not limited to Wi-Fi.

In an earthquake emergency, power conservation is of major concern. To conserve power, the device 100 may automatically turn off all user space applications, background system operations, and unnecessary hardware functions, and wake up periodically to detect the presence of the trusted nodes 150.

Urban fires create a unique challenge that allows for very limited rescue time. A fire fighter can carry (e.g., wear) the trusted node 150 as part of the firefighting gear when entering a fire scene. Compared with an earthquake emergency, power conservation in a fire emergency is usually less of a concern. Due to the urgency of the fire emergency, the device 100 may keep all functions on, and there may be no time to set up multiple trusted nodes 150 for trilateration. When the device 100 receives a timing measurement frame from a predetermined emergency identifier, the device 100 turns on its siren to let the rescuer know its location. In one embodiment, the device 100 may turn on its siren in addition to sending a response with the timing information. In one embodiment, the device 100 may use the timing information from the trusted node 150 to measure its distance to the trusted node 150, such that a siren is generated only when the trusted node 150 is within a predetermined distance (e.g., 20 meters). In one embodiment, the device 100 may generate the siren regardless of its distance to the trusted node 150.

Figure 3A:
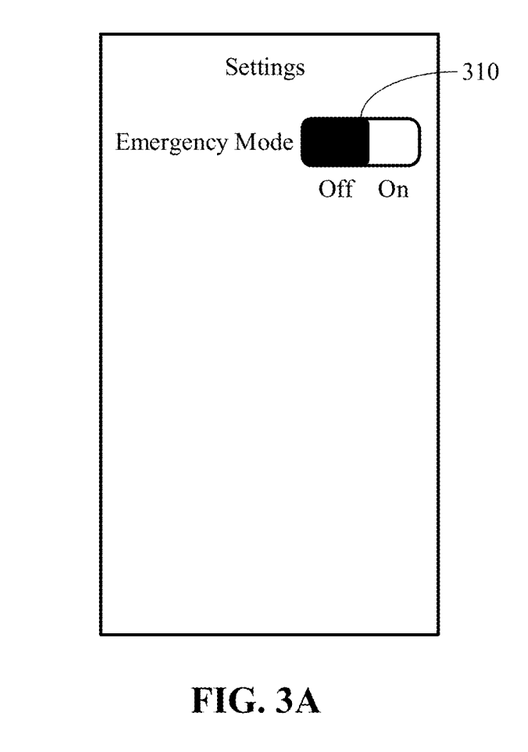
FIGS. 3A-3C illustrate examples of the mechanisms by which a user may enable an emergency mode on a portable electronic device.
Figure 3B:
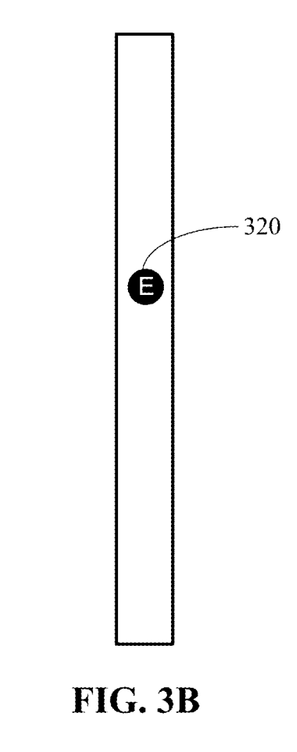
Figure 3C:
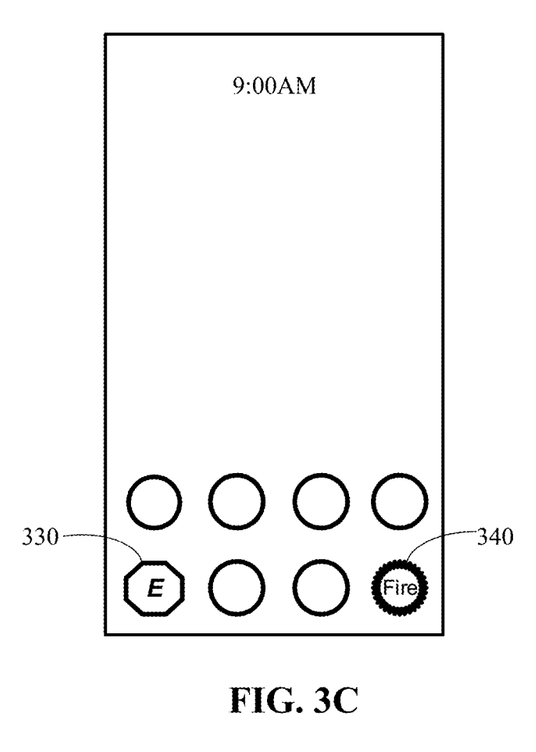

FIGS. 3A-3D illustrate examples of the mechanisms by which a user may enable the emergency mode. It is understood that the examples described herein are illustrative and not exhaustive; many alternatives may exist. FIG. 3A illustrates that the emergency mode may be turned on (i.e., enabled) by swiping a soft switch 310 in the settings menu on a touch screen display. FIG. 3B illustrates that the device 100 may include a button 320 (e.g., on the side of the device 100) that can be pressed to enable the emergency mode. FIG. 3C illustrates that the device 100 may display a number of icons, one of which may be an emergency mode icon 330 for enabling the emergency mode. A number of mechanisms may be provided for a user to differentiate an earthquake emergency and a fire emergency. For example, a separate fire emergency icon 340 may be provided on the display for enabling the emergency mode specialized for fire; the emergency mode icon 330 in this example would be specialized for earthquake emergency. Similarly, in the examples of FIGS. 3A and 3B, another soft switch and another button may be provided, respectively, for a user to enable the emergency mode specialized for fire. Alternatively, after a user enables the emergency mode by using the soft switch 310, the button 320 or the icon 330, a user may further specify the type of emergency (e.g., earthquake or fire) via another screen display or voice input.

Figure 4:
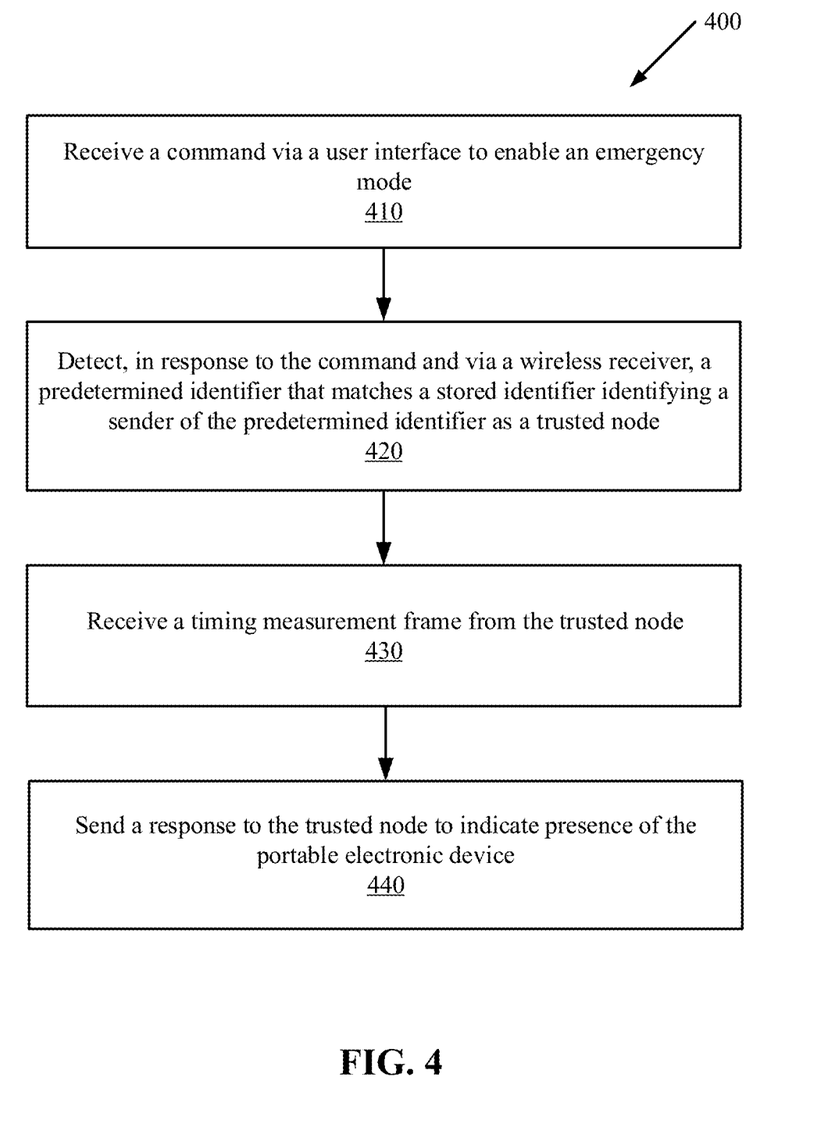
FIG. 4 is a flow diagram illustrating a method for a portable electronic device to provide an emergency mode according to an embodiment.

FIG. 4 is a flow diagram illustrating a method 400 for a portable electronic device to provide an emergency mode according to one embodiment. The method 400 can be performed by a portable electronic device, such as the device 100 of FIG. 1. In one embodiment, the method 400 begins with the device receiving a command via a user interface to enable the emergency mode (step 410). In response to the command and via a wireless receiver, the device detects a predetermined identifier that matches a stored identifier identifying a sender of the predetermined identifier as a trusted node (step 420). The device also receives a timing measurement frame from the trusted node (step 430). The device then sends a response to the trusted node to indicate its presence (step 440). The response may be different for an earthquake emergency and for a fire emergency. Furthermore, the device may follow different power management strategies for an earthquake emergency and for a fire emergency, as will be described in further detail below.

Figure 5:
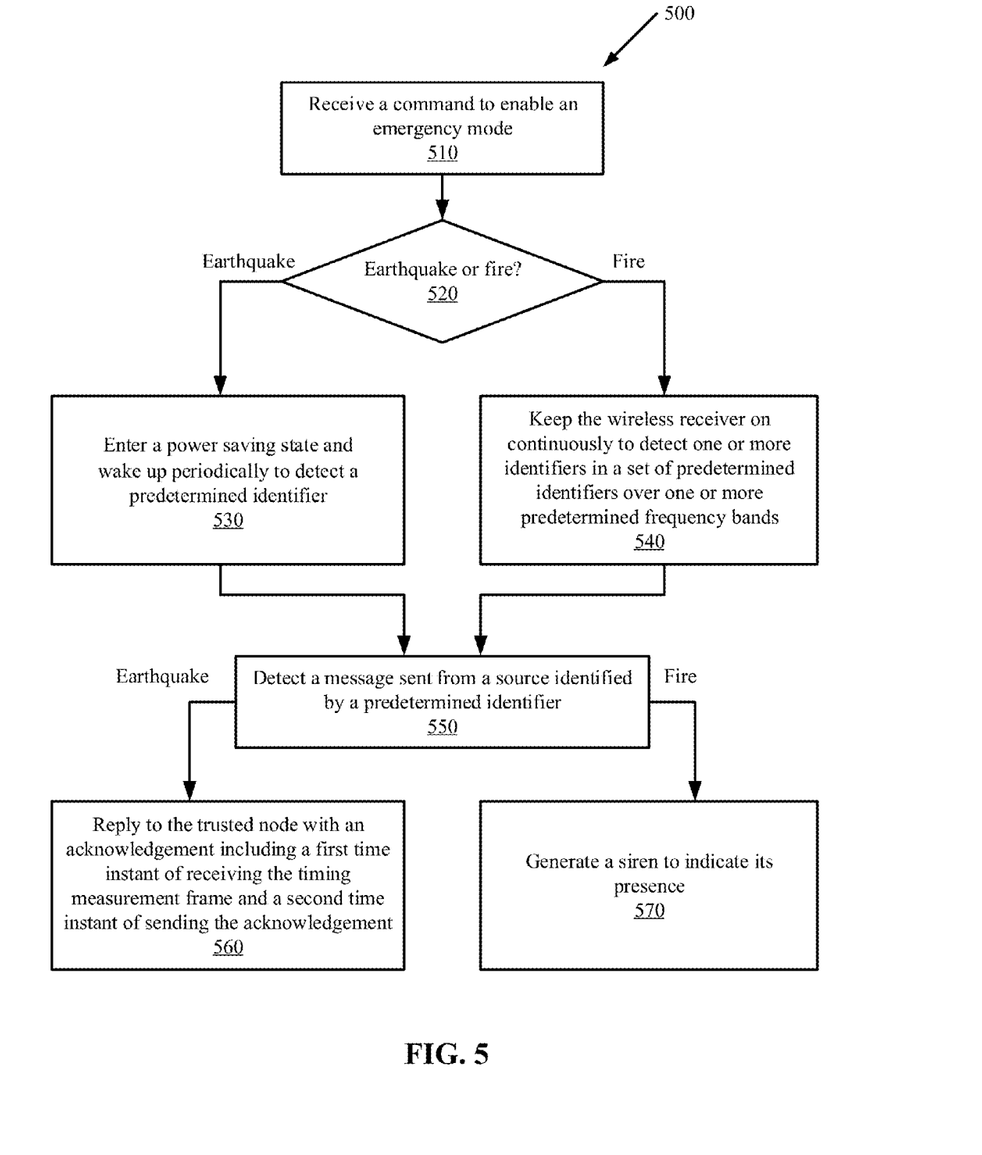
FIG. 5 is a flow diagram illustrating a method for emergency mode operations performed by a portable electronic device according to one embodiment.

FIG. 5 is flowchart illustrating a method 500 for emergency mode operations according to one embodiment. The method 500 can be performed by a portable electronic device, such as the device 100 of FIG. 1. In one embodiment, the method 500 begins with the device receiving a command to enable an emergency mode (step 510). According to the user input, the device determines whether the emergency mode is enabled due to earthquake or fire (step 520).

If the emergency mode is enabled due to earthquake, the device enters a power saving state and wakes up periodically to detect a predetermined identifier (step 530). The device also turns off as much functions (e.g., unnecessary user space and system space applications, unnecessary hardware functions, etc.) as possible to save power. The predetermined identifier may be any one in a set of identifiers stored in the device memory. The detection may be made to a predetermined frequency band (e.g., 2.4 GHz); alternatively, more than one frequency band may be used for detection. If the emergency mode is enabled due to fire, the device keeps the wireless receiver on continuously to detect one or more identifiers in a set of predetermined identifiers over one or more predetermined frequency bands (step 540). To maximize the chances of detection, multiple frequency bands may be used for the detection; e.g., both 2.4 GHz and 5 GHz.

In either earthquake or fire emergency, the device responds when it receives a message sent from a source specified by a predetermined identifier (step 550). The message may be a timing measurement frame. In the case of earthquake, the device replies to the trusted node with an acknowledgement including a first time instant of receiving the timing measurement frame and a second time instant of sending the acknowledgement (step 560). In the case of fire, the device generates a siren to indicate its presence (step 570).

The emergency mode described herein balances security and safety concerns. When the emergency mode is turned on, safety is prioritized over security such that the device is configured to listen to and respond to a special emergency identifier. When the emergency mode is turned off, security is prioritized over safety to prevent the device location from being tracked by a malicious party. In an alternative embodiment, a user has a choice to configure the device such that the device listens to and responds to a special emergency identifier at all times, even though the emergency mode is not turned on. This alternative device configuration allows the device to be trackable by a trusted node during an emergency even if the user loses the ability to manually turn on the emergency mode. In one embodiment, this alternative device configuration may be set up via the device's setting menu or another user interface mechanism.

Figure 6:
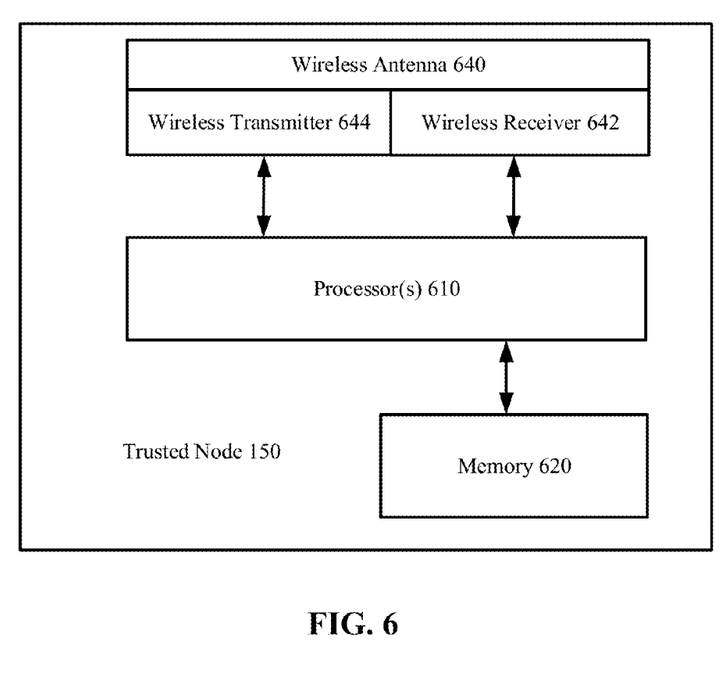
FIG. 6 is a block diagram of a trusted node according to one embodiment.

FIG. 6 is a block diagram illustrating the trusted node 150 according to one embodiment. The trusted node 150 includes a wireless antenna 640, which further includes a wireless transmitter 644 and a wireless receiver 642 to transmit and receive wireless signals, respectively. The trusted node 150 also includes a memory 620 to store a predetermined identifier (i.e., an emergency SSID) to which a device (e.g., the device 100 of FIG. 1) in the emergency mode is configured to respond. The trusted node 150 also includes one or more processors, which are operative to: send the predetermined identifier and a timing measurement frame via the wireless transmitter 644, and determine a distance to the device based on a response from the device. When multiple ones of the trusted nodes 150 are deployed in a disaster site, the trusted nodes can determine the location of the device using the distance determined by each trusted node. In one embodiment, each trusted node is a Wi-Fi portable access point.

The operations of the flow diagrams of FIGS. 4 and 5 have been described with reference to the exemplary embodiment of FIG. 1. However, it should be understood that the operations of the flow diagrams of FIGS. 4 and 5 can be performed by embodiments of the invention other than the embodiment of FIG. 1, and the embodiment of FIG. 1 can perform operations different than those discussed with reference to the flow diagrams. While the flow diagrams of FIGS. 4 and 5 show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:

1. A method performed by a portable electronic device to provide an emergency mode, comprising:
 receiving, by the portable electronic device via a user interface, a command that enables the emergency mode of the portable electronic device;
 in response to receiving the command that enables the emergency mode, turning off one or more applications, system operations or hardware functions of the portable electronic device;
 detecting, by the portable electronic device while the emergency mode is enabled, a broadcast message including one of stored identifiers stored in the portable electronic device, wherein each of the stored identifiers identifies a sender of the broadcast message as a first trusted node;
 receiving, by the portable electronic device from the first trusted node while the emergency mode is enabled, a timing measurement frame based on which a first distance between the portable electronic device and the first trusted node is calculated;
 sending a response to the timing measurement frame from the portable electronic device to the first trusted node;
 receiving, by the portable electronic device from a second trusted node while the emergency mode is enabled, a second timing measurement frame based on which a second distance between the portable electronic device and the second trusted node is calculated; and
 sending a response to the second timing measurement frame from the portable electronic device to the second trusted node, whereby a location of the portable electronic device is determined based on at least the first and second distances.

2. The method of claim 1, wherein detecting the broadcast message further comprises:
 detecting one or more identifiers in a set of predetermined identifiers, each predetermined identifier identifying one or more trusted nodes.

3. The method of claim 1, wherein the receiving of the first and second timing measurement frames is performed by a Wi-Fi receiver operative to receive wireless signals over one or more Wi-Fi frequency bands.

4. The method of claim 1, wherein sending the response further comprises:
replying to the first trusted node with an acknowledgement including a first time instant of receiving the timing measurement frame and a second time instant of sending the acknowledgement.

5. The method of claim 1, wherein the timing measurement frame is a Fine Timing Measurement (FTM) protocol according to WLAN standard practices and associated technologies.

6. The method of claim 1, wherein, in response to the command, the method further comprises:
entering a power saving state; and
waking up periodically from the power saving state to attempt to detect a stored identifier.

7. The method of claim 1, wherein sending the response further comprises:
generating a siren to indicate the presence of the portable electronic device.

8. The method of claim 1, further comprising:
keeping a wireless receiver on continuously to detect one or more identifiers in a set of predetermined identifiers over one or more predetermined frequency bands.

9. The method of claim 1, wherein the broadcast message, the timing measurement frame and the response are conveyed via wireless communication.

10. The method of claim 1, further comprising:
receiving, by the portable electronic device from a third trusted node while the emergency mode is enabled, a third timing measurement frame based on which a third distance between the portable electronic device and the third trusted node is calculated; and
sending a response to the third timing measurement frame from the portable electronic device to the third trusted node, whereby a location of the portable electronic device is determined based on the first, second and third distances.

11. A portable electronic device that provides an emergency mode, comprising:
a wireless antenna including a wireless transmitter and a wireless receiver to transmit and receive wireless signals, respectively;
a memory to store one or more identifiers;
a user interface to receive a command that enables the emergency mode; and
one or more processors coupled to the wireless antenna, the memory and the user interface, wherein the one or more processors, in response to the command, are operative to:
in response to receiving the command that enables the emergency mode, turn off one or more applications, system operations or hardware functions of the portable electronic device;
detect, while the emergency mode is enabled, a broadcast message including one of stored identifiers stored in the memory, wherein each of the stored identifiers identifies a sender of the broadcast message as a first trusted node;
receive, from the first trusted node while the emergency mode is enabled, a timing measurement frame based on which a first distance between the portable electronic device and the first trusted node is calculated;
send a response to the timing measurement frame to the first trusted node;
receive, by the portable electronic device from a second trusted node while the emergency mode is enabled, a second timing measurement frame based on which a second distance between the portable electronic device and the second trusted node is calculated; and
send a response to the second timing measurement frame from the portable electronic device to the second trusted node, wherein a location of the portable electronic device is determined based on at least the first second distances.

12. The portable electronic device of claim 11, wherein the one or more processors, in response to the command, are further operative to:
detect one or more identifiers in a set of predetermined identifiers, each predetermined identifier identifying one or more trusted nodes.

13. The portable electronic device of claim 11, wherein the wireless receiver includes a Wi-Fi receiver operative to receive wireless signals over one or more Wi-Fi frequency bands.

14. The portable electronic device of claim 11, wherein the one or more processors, in response to the timing measurement frame, are further operative to:
reply to the first trusted node with an acknowledgement including a first time instant of receiving the timing measurement frame and a second time instant of sending the acknowledgement.

15. The portable electronic device of claim 11, wherein the timing measurement frame is a Fine Timing Measurement (FTM) protocol according to WLAN standard practices and associated technologies.

16. The portable electronic device of claim 11, wherein the one or more processors, in response to the command, are further operative to:
enter a power saving state; and
wake up periodically from the power saving state to attempt to detect a stored identifier.

17. The portable electronic device of claim 11, wherein the one or more processors, in response to the command, are further operative to:
generate a siren to indicate presence of the portable electronic device.

18. The portable electronic device of claim 11, wherein the one or more processors, in response to the command, are further operative to:
keep the wireless receiver on continuously to detect one or more identifiers in a set of predetermined identifiers over one or more predetermined frequency bands.

19. The portable electronic device of claim 11, wherein the one or more processors are operative to:
receive, by the portable electronic device from a third trusted node while the emergency mode is enabled, a third timing measurement frame based on which a third distance between the portable electronic device and the third trusted node is calculated; and
send a response to the third timing measurement frame from the portable electronic device to the third trusted node, wherein a location of the portable electronic device is determined based on the first, second and third distances.

* * * * *